(12) United States Patent
Kim et al.

(10) Patent No.: US 10,977,525 B2
(45) Date of Patent: Apr. 13, 2021

(54) INDOOR LOCALIZATION USING REAL-TIME CONTEXT FUSION OF VISUAL INFORMATION FROM STATIC AND DYNAMIC CAMERAS

(71) Applicant: FUJI XEROX CO., LTD., Tokyo (JP)

(72) Inventors: Chelhwon Kim, Palo Alto, CA (US); Chidansh Amitkumar Bhatt, Mountain View, CA (US); Miteshkumar Patel, San Jose, CA (US); Donald Kimber, Foster City, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 77 days.

(21) Appl. No.: 16/370,676

(22) Filed: Mar. 29, 2019

(65) Prior Publication Data

US 2020/0311468 A1 Oct. 1, 2020

(51) Int. Cl.
| | | |
|---|---|---|
| *G06K 9/62* | (2006.01) | |
| *H04W 4/33* | (2018.01) | |
| *G06N 3/08* | (2006.01) | |
| *H04N 5/247* | (2006.01) | |
| *G06F 16/587* | (2019.01) | |
| *G06F 16/532* | (2019.01) | |
| *G06K 9/00* | (2006.01) | |

(52) U.S. Cl.
CPC .......... *G06K 9/629* (2013.01); *G06F 16/532* (2019.01); *G06F 16/587* (2019.01); *G06K 9/00771* (2013.01); *G06K 9/6232* (2013.01); *G06N 3/08* (2013.01); *H04N 5/247* (2013.01); *H04W 4/33* (2018.02)

(58) Field of Classification Search
CPC .. G06K 9/629; G06K 9/00771; G06K 9/6232; G06F 16/532; G06F 16/587; G06F 16/9027; H04W 4/33; H04N 5/247; H04N 5/23293; G06N 3/08
See application file for complete search history.

(56) References Cited

U.S. PATENT DOCUMENTS

2019/0244271 A1* 8/2019 Piramuthu .............. G06F 3/017
2020/0226421 A1* 7/2020 Almazan .............. G06K 9/6256

OTHER PUBLICATIONS

Davidson, P., et al., A Survey of Selected Indoor Positioning Methods for Smartphones, IEEE Communications Surveys & Tutorials, 19(2), 2017, pp. 1347-1370.
(Continued)

*Primary Examiner* — Diane D Mizrahi
(74) *Attorney, Agent, or Firm* — Procopio, Cory, Hargreaves & Savitch LLP

(57) ABSTRACT

A computer-implemented method of localization for an indoor environment is provided, including receiving, in real-time, a dynamic query from a first source, and static inputs from a second source; extracting features of the static inputs by applying a metric learning convolutional neural network (CNN), and aggregating the extracted features of the static inputs to generate a feature transformation; and iteratively extracting features of the dynamic query on a deep CNN as an embedding network and fusing the feature transformation into the deep CNN, and applying a triplet loss function to optimize the embedding network and provide a localization result.

20 Claims, 12 Drawing Sheets
(9 of 12 Drawing Sheet(s) Filed in Color)

(56) References Cited

OTHER PUBLICATIONS

Xu, H., et al., Indoor localization via multi-modal sensing on smartphones, UbiComp '16, In Proceedings of the 2016 ACM International Joint Conference on Pervasive and Ubiquitous Computing, Sep. 12-16, 2016, Heidelberg, Germany, pp. 208-219.

Taira, H., et al., InLoc: Indoor Visual Localization with Dense Matching and View Synthesis, CVPR '18, IEEE Conference on Computer Vision and Pattern Recognition, Jun. 2018, Salt Lake City, pp. 7199-7209.

Yan, J., et al., Low-Cost Vision-Based Positioning System, 14th International Conference on Location Based Services (LBS 2018), Zurich, Switzerland, Jan. 15-17, 2018, pp. 44-49.

Carrillo, D., et al., MagicFinger: 3D magnetic fingerprints for indoor location, Sensors (Basel), Jul. 2015, 15(7), pp. 17168-17194.

Patel, M., et al., ContextualNet: Exploiting Contextual Information Using LSTMs to Improve Image-Based Localization, IEEE International Conference on Robotics and Automation (ICRA), 2018, 7 pgs.

Lowe, D.G., Object recognition from local scale-invariant features, The Proceedings of the Seventh IEEE International Conference, 1999, vol. 2, pp. 150-1157.

Bay, H., et al., SURF: Speeded Up Robust Features, European Conference on Computer Vision, 2006, pp. 404-417.

Detone, D., et al., SuperPoint: Self-Supervised Interest Point Detection and Description, arXiv:1712.07629, Dec. 20, 2017, pp. 337-349.

Philbin, J., et al., Object retrieval with large vocabularies and fast spatial matching, 2007 IEEE Conference on Computer Vision and Pattern Recognition, Jun. 17, 2007, pp. 1-8.

Jegou, H., et al., Aggregating local image descriptors into compact codes, IEEE Transactions on Pattern Analysis and Machine Intelligence, 34(9), Sep. 2012, 13 pgs.

Schroff, F., et al., Facenet: A unified embedding for face recognition and clustering, In Proceedings of the IEEE Computer Society Conference on Computer Vision and Pattern Recognition 2015, 10 pgs.

Arandjelovic, R., et al., NetVLAD: CNN Architecture for Weakly Supervised Place Recognition, in IEEE Transactions on Pattern Analysis and Machine Intelligence, 40(6), Jun. 1, 2018, pp. 5297-5307.

Perez, E., et al., FiLM: Visual Reasoning with a General Conditioning Layer, arXiv:1709.07871, Sep. 22, 2017, 13 pgs.

Ghiasi, G., et al., Exploring the structure of a real-time, arbitrary neural artistic stylization network, arXiv:1705.06830, May 18, 2017.

Wang, X., et al., Recovering realistic texture in image super-resolution by deep spatial feature transform, arXiv:1804.02815, Apr. 9, 2018, 10 pgs.

* cited by examiner

INDOOR LOCALIZATION USING REAL-TIME CONTEXT FUSION OF VISUAL INFORMATION FROM STATIC AND DYNAMIC CAMERAS

BACKGROUND

Field

Aspects of the example implementations relate to methods, systems and user experiences associated with providing indoor localization information based on visual features from static images, such as those captured by surveillance cameras, augmented with images captured by user devices, while learning real time contextual information.

Related Art

There is a related art need to be able to navigate easily through unknown indoor buildings, or large complexes. Related art approaches such as global positioning system (GPS) or other navigational tools cannot provide sufficient information. For example, in robotics as well as human navigation, related art approaches have focused on solutions having large-scale sensory infrastructures such as Internet of things (IoT) and/or computer vision (CV). Such related art approaches may provide visualization in predictable scenarios, such as seasonal changes between winter and summer, or changes between daytime and nighttime, as well as structured scenarios, such as streets having building structures that do not change frequently.

In the related art, indoor localization is desired by users to locate people and places in large buildings such as offices, universities, malls, airports, sports venues, conventions, etc. Such indoor localization may be useful to provide awareness of user location, and for integration with applications that may perform functions such as automatic tagging of posts and pictures (e.g., context-aware applications). Further, the related art indoor localization may be useful for robotics applications, as well as AR/VR applications, in indoor environments.

Related art indoor localization approaches have focused on use of smart phone equipment, such as global navigation satellite system (GNSS) for GNSS-assisted receivers. This related art approach is limited in its usefulness to functions such as street navigation with a smart phone. Further, related art approaches such as GPS are not viable, due to problems and disadvantages associated with GPS signals suffering from non-line of sight (NLOS) issues in indoor environments.

The related art approaches have various disadvantages and problems. For example, but not by way of limitation, the related art approaches do not provide accurate localization for situations where there are unpredictable changes, such as a change in the number of people in an enclosed location, such as due to events, as well as unstructured changes, such as changes in the furniture or floorplan associated with an enclosed space. The related art systems cannot account for these types of changes.

More specifically, related art approaches do not provide a technology that can reliably deliver indoor positioning using terminal devices. Related art approaches that have included radiofrequency (RF) signals such as wireless local-area networks, cellular, UWB, RFID, NFC, Bluetooth Low Energy and the like have been attempted on smartphones. However, these related art approaches have failed to provide complete solution to indoor positioning requirements. Further, these related art approaches require the deployment of new infrastructure. The related art approaches may also have a high cost for maintenance of infrastructure having multiple sensors, and may not be able to provide results as the sensors and the infrastructure changes.

Other related art approaches are associated with computer vision-based smart phone and surveillance cameras. However these related art approaches involve large-scale images and require pre-calibration to construct an image database. Such a related approach requires a large amount of labor and overhead, and thus cannot meet real time localization requirements. Further, these related art approaches result in a substantial variation between the image data collected at different time instances due to factors such as changes in a number of persons or layout of an environment.

More specifically, computer vision based techniques that use related art feature-based image to image matching are unable to provide accurate results. For example, there is a large variation in terms of captured content from different viewpoints, as well as between static and dynamic camera images within each zone. Further, the individual surveillance cameras each have a limited field of view, which may be unable to cover the full environment context within each zone. Additionally, the related art lack of incorporation of complete environmental context across all the zones may cause various problems and disadvantages, such as a large visual similarity across several different zones, such as similar walls, carpets or ceilings, in the complete environment. Such related art approaches may confuse the zone detection task of the computer vision, and cause incorrect detection results.

FIG. 1 illustrates various situations 100 in which related art approaches fail to provide indoor localization. For example, at 101, an indoor environment is shown having a large number of people and open shutters. At 103, the same indoor environment is shown not having any people present, and closed shutters. Additionally, at 105, an indoor environment is shown having framed art on the wall, computer monitors on the table, ceiling lights off, and chairs positioned away from the tables. At 107, the same indoor environment is shown without the framed art on the wall, with the computer monitors in the same position on the table, the ceiling lights on, and the chairs repositioned to be in front of each of the computer monitors. In each of these environments, the related art approaches fail to provide localization information that accounts for the changes in the local environment.

Thus, there is an unmet need to provide indoor localization information that takes into account the changes in the local environment.

SUMMARY

According to aspects of the example implementations, a computer-implemented method of localization for an indoor environment, comprising receiving, in real-time, a dynamic query from a first source, and static inputs from a second source; extracting features of the dynamic query on a deep convolutional neural network (CNN) as an embedding network; and extracting features of the static inputs by applying a CNN as a condition network, and aggregating the extracted features of the static inputs to generate a feature transformation, and modulate the intermediate features of the embedding network by using the feature transformation; and applying a triplet loss function to optimize the embedding network and the condition network, and provide a localization result.

According to aspects of the example implementations, the extracting the features of the dynamic query on the deep CNN further comprises applying a metric learning CNN, and iteratively extracting the features of the dynamic query on the deep CNN and fusing the feature transformation into the deep CNN.

According to some aspects of the example implementations, the localization result comprises a prediction indicative of a location of the first source in the indoor environment.

According to other aspects, the dynamic query comprises an image and the first source is a mobile terminal device associated with a user, and the real-time static inputs comprise static images from the second source comprising a cameras networked in the indoor environment.

According to additional aspects, the static inputs are geo-tagged.

According to still other aspects, wherein the localization result is provided during an unpredictable condition and/or an unstructured condition in the indoor environment. Further, the unpredictable condition may be a change in objects and/or persons in the indoor environment, and the unstructured condition may be a change in a layout of the indoor environment.

According to further aspects, the extracted features associated with the static inputs comprise high-level context information, and wherein the feature transformation comprises a scaling parameter and a shifting parameter.

Example implementations may also include a non-transitory computer readable medium having a storage and processor, the processor capable of executing instructions for assessing whether a patent has a condition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
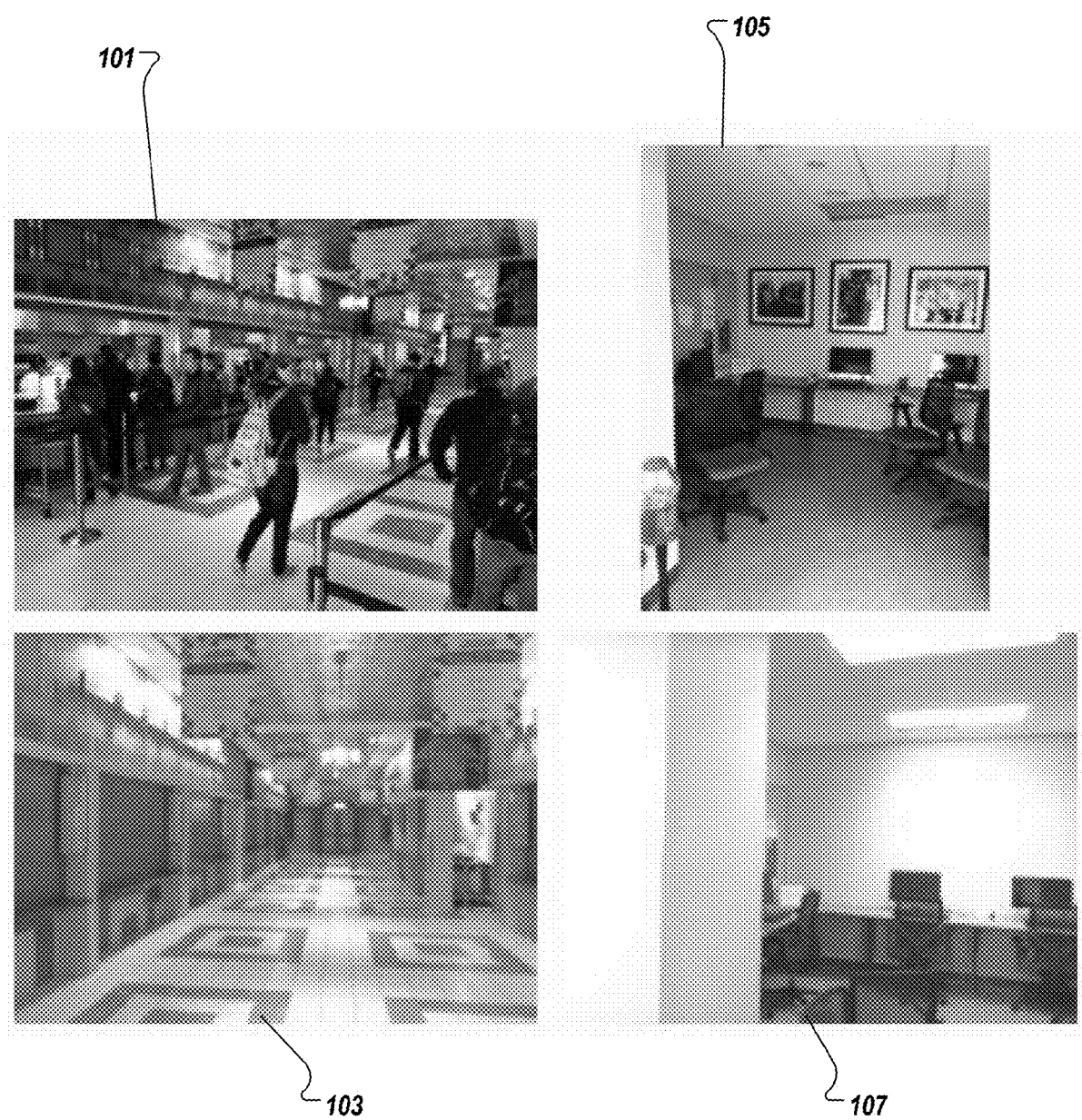
FIG. 1 illustrates related art failure cases associated with various example environments.

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to providing visualization information for indoor localization, based on static images captured by sensing devices such as surveillance cameras, augmented with dynamic information, provided by images from user devices, such as smart devices or the like, while learning the real time contextual information, so as to deliver the accurate localization. For example, but not by way of limitation, the example implementations may provide one or more users with discrete location information, for environments having unpredictable and unstructured changes, which can be used for navigation and/or localization in the indoor environment.

According to the example implementations, a vision based indoor localization system is provided that may be used in indoor environments having existing static sensing infrastructure, such as surveillance camera systems that are found in most commercial building spaces and large public gathering environments. By using the images captured by the static sensing infrastructure, the example implementations combine that static information with dynamic images provided by user devices, to obtain zone level positions within an indoor environment and assist a user or robot to successfully navigate the indoor environment. For example, the example implementations may provide advantages such as lower cost, faster and more scalable outputs, and usability in environments where related art approaches fail.

More specifically, the example implementations are directed to the effective image matching and retrieval. Information from the static images of the static sensing infrastructure, such as from surveillance cameras monitoring the environment continuously, are fused with dynamic, user generated images such as those provided by smart phones, in the environment. Thus, the example implementations leverage both the unpredicted and unstructured environmental changes across zones from static images, as well as the real time salient information associated with the environments from dynamic images.

According to aspects of the example implementations, an image retrieval pipeline is provided. More specifically, a query image is provided, to visually search a geo-tagged image database, using an image matching algorithm. The locations of matched database images are used to approximate location of the query image.

For the visual analysis of the image matching, an image may be encoded into a compact visual feature with high discriminability, to achieve high accuracy and efficiency in search performance. In contrast to the related art image retrieval systems that use hand engineered local feature descriptors, and or aggregation techniques, to compress the visual features into a single vector, the example implementations are directed to use of a metric learning technique to learn a compact Euclidean embedding space, using a deep convolutional neural network (CNN). The distances directly correspond to a measure of visual similarity of images. The example implementation, including the metric learning, substantially simplifies visual matching, which may be executed using simple squared L2 Euclidean distance metrics in the learned embedding space.

According to the example implementations, triplet loss is used to learn embedding. More specifically, the Euclidean distance between images taken in the same place, regardless of viewing conditions due to factors such as camera pose and environmental change, is substantially minimized, whereas the distance between a pair of images captured in different places is large. For the feature extraction, a deep CNN architecture is implemented to encode an image into local descriptors, followed by a global pooling layer, to aggregate all the local descriptors into a single vector in a low-dimensional space. The parameters of the architecture according to the example implementations are trained in an end-to-end manner, the triplet loss being used to directly optimize the embedding space for the visual search task.

Figure 2:
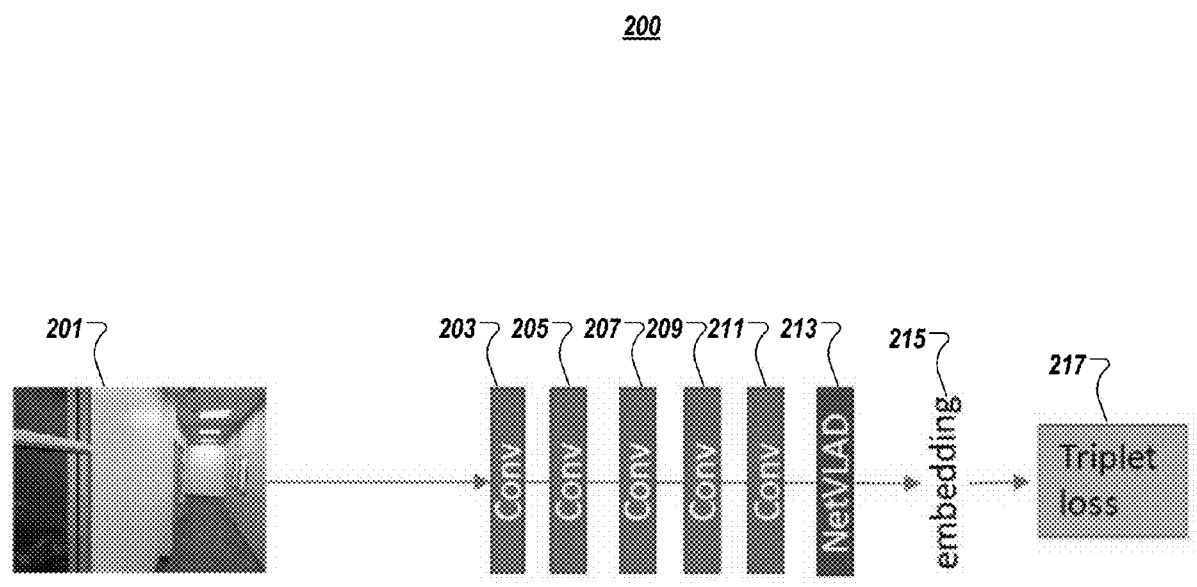
FIG. 2 illustrates a baseline network architecture according to an example implementation.

FIG. 2 illustrates a network architecture according to the example implementation at 200. For example, information 201 is received from a dynamic sensor, such as a camera associated with a smart phone of a user. This image represents the query image. The query image is provided to the deep CNN architecture at 203, 205, 207, 209, 211, which encodes the image into local descriptors. At 215, the global pooling layer aggregates the local descriptors into a single vector in the low-dimensional space. At 217, a triplet loss is determined. In other words, a triplet loss function is applied to optimize the embedding network for providing the localization result in the indoor environment (e.g., a prediction of a location zone of the first source).

According to the example implementations, two methods are provided to fuse information that is captured from the static sensing infrastructure and the dynamic sensing inputs, in the metric learning framework. These example methods are illustrated in FIGS. 3 and 4 respectively, and are described in greater detail below.

Figure 3:
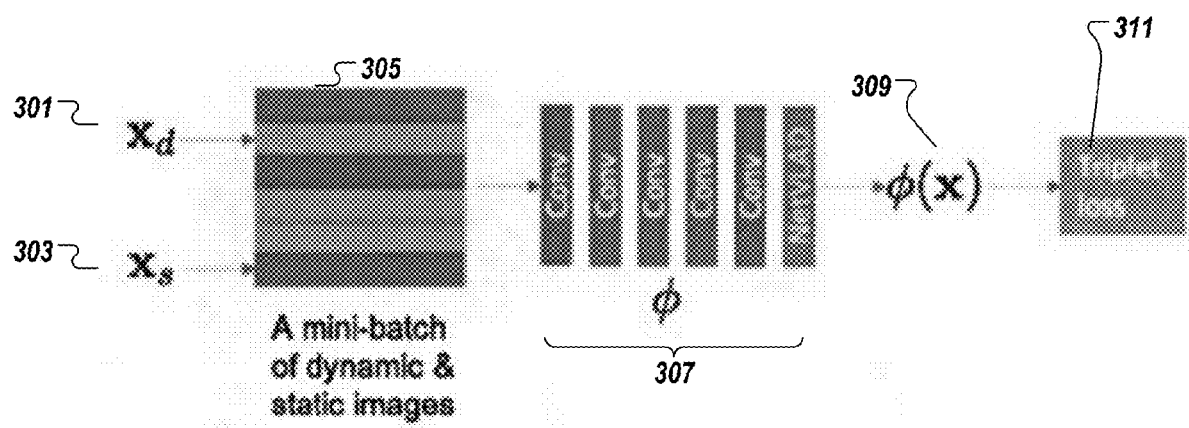
FIG. 3 illustrates information fusing according to a first example implementation.
Figure 4:
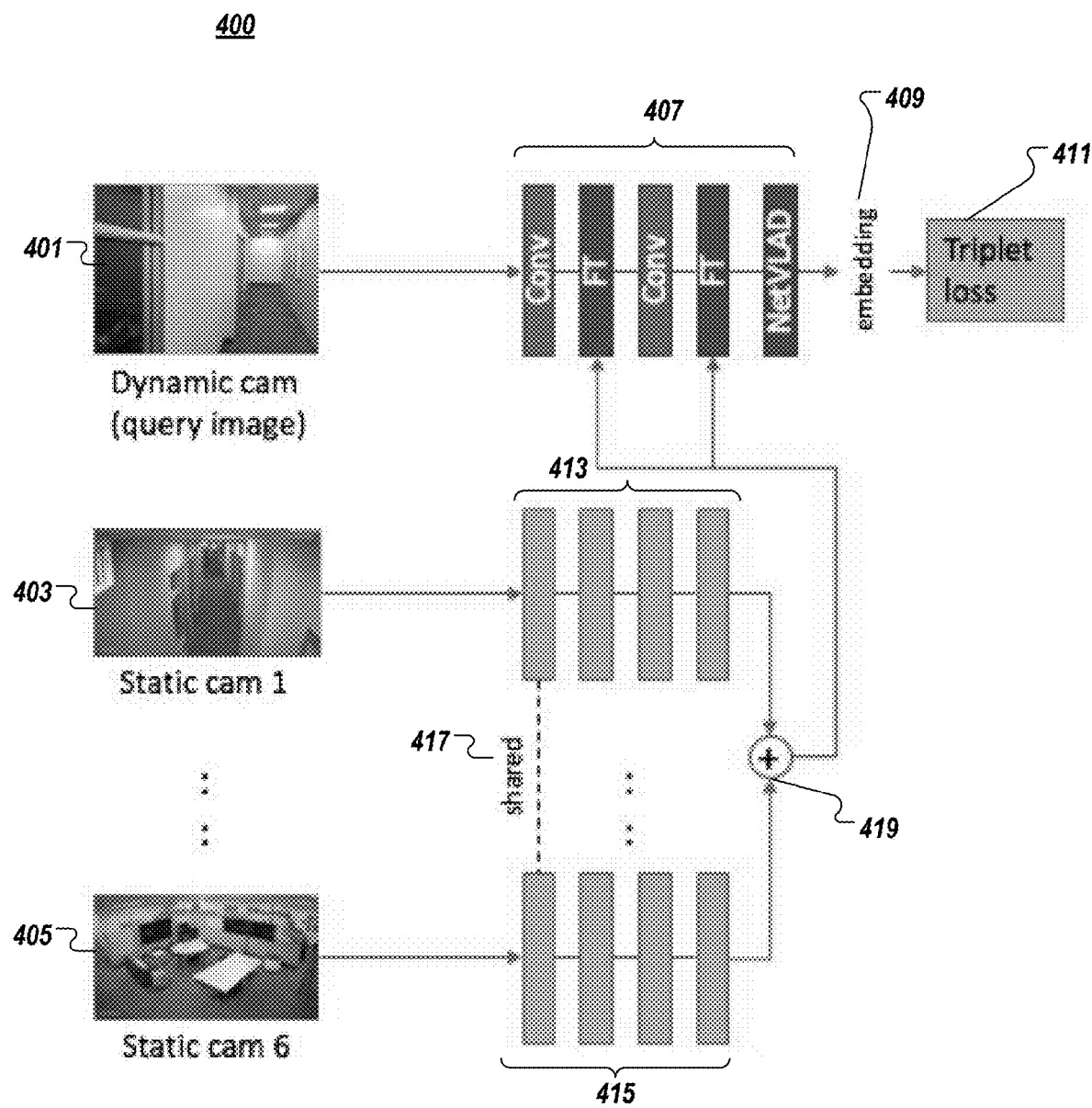
FIG. 4 illustrates information fusing according to a second example implementation.

FIG. 3 illustrates a first method of fusing the static and dynamic information according to an example implementation. As shown in 300, the static sensed images, such as those from a surveillance camera, are used in the online triplet mining by composing a mini batch with images connected from the dynamic source as well as the static source. This is shown at 301 and 303, respectively as inputs, to generate the mini batch 305 that is composed of the static and dynamic images.

Once the embedding space is generated, the image matching between the query image from the dynamic source, also explained above as the smart phone camera image with respect to FIG. 2, and the static sources, is performed. The image matching is performed concurrently with the collection of the images, rather than requiring the searching of information from a pre-collected database, so that the example implementation can use real-time information from the current surveillance cameras that are the static information source in an explicit manner. The zone level prediction label is represented as shown below in (1):

$$\arg\min_i \|\phi(x_d(t)) - \phi x_{si}(t)\|^2 \qquad (1)$$

It is noted that $x_d(t)$ represents the query image capture by the dynamic sensor, such as a smart phone camera at time t, and $x_{si}(t)$ represents the image captured by the static source, such as the surveillance camera, in zone i at the same time t.

Once the foregoing operations have been performed, the feature extraction and the aggregation is performed at 307, and the embedding vector is obtained at 309, and the triplet loss at 311 is used to optimize the parameters in 307, as explained above with respect to FIG. 2.

According to a second example approach, the dynamic and static information sources are fused using a feature wise transformation, that permits alternating of the behavior of the embedding network, conditioned on the static camera images.

FIG. 4 illustrates a second example approach 400 according to the example implementations. The main embedding network receives as its input the dynamic sensor image, and embeds the dynamic sensor image into a compact Euclidean space, as explained herein. More specifically, this is shown as input 401, such as a smart phone image received from a user terminal, being fed into an embedding network 407.

Additionally, a second network is provided that receives as its inputs the various images received from the static sources, which may be one or more surveillance cameras, with the same time instance, as shown at 403, 405. High-level context information is extracted and aggregated from the images, using a CNN architecture at 413 and 415, with each convolution sharing across the plural surveillance cameras as represented at 417.

The result of the extraction aggregation at 419 of the high-level context information is provided to modulate the main embedding network 407, by way of transforming features of intermediate layers of the network, by way of a feature transform layer FT. The feature transform layer FT provides integration of the conditioning information into the network, and the transformation may be represented below in (2):

$$FT(x) = \gamma * x + \beta \qquad (2)$$

It is noted that x represents the feature activations of the intermediate layer of the embedding network at 407, and γ and β respectively represent scaling and shifting parameters that are produced by the condition network.

Once the metric learning as explained above has been performed and integrated into the embedding network 407, the pooling is performed as explained above, followed by embedding at 409 and triplet loss determination at 411.

All of the parameters of the embedding network 407 and the condition network 413, 415, 419 are trained in an end-to-end manner, with the triplet loss, to directly optimize the embedding space for the visual search task.

Once the conditioned embedding space is produced, the dynamic camera images in the training set are converted into the embedding vectors, and a mean of the embeddings belonging to the same zone is computed. The mean embeddings for all the zones are stored, such as in an off-line database, for example not by way of limitation. The query image, such as from the smart phone and corresponding static source images, such as the surveillance camera images, with the same time instance are used to compute the embedding vector by use of the trained two networks described above. The nearest database mean embedding vector to the query is used to determine the zone index.

Figure 5:
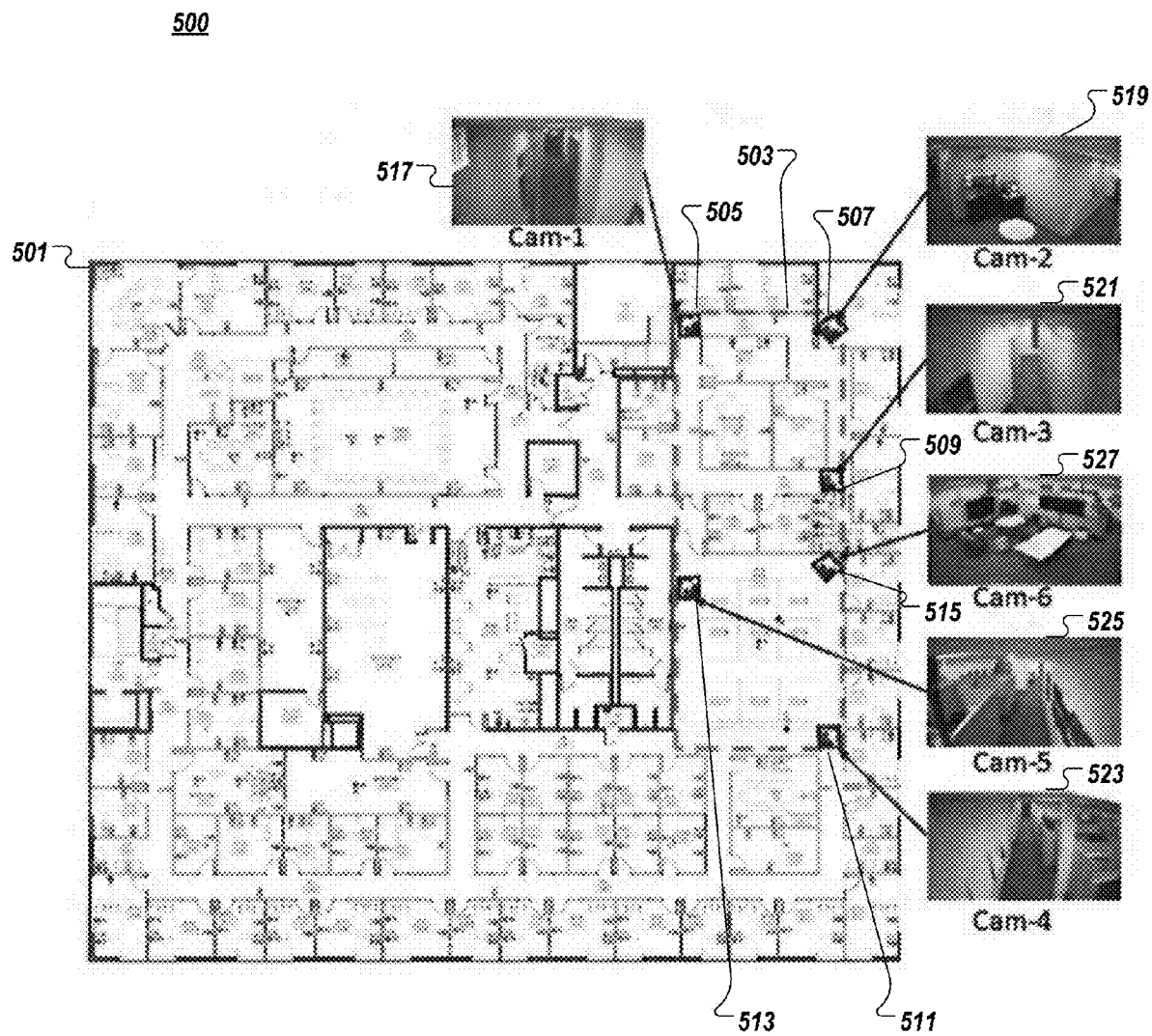
FIG. 5 illustrates example environments sensed by dynamic and static sensors under various example implementations.

FIG. 5 illustrates an example indoor environment 500 that implements the example implementations. According to the example implementation, there is no public data set containing query images with zone level labels, along with associated surveillance images with corresponding timestamps, as the query image for the same indoor environment. While these data sets are directed to small room scale scenes or multiple rooms, the example implementations are not limited thereto, and other scales and scopes of indoor space may be substituted therefore without departing from the inventive scope.

Different parts of the indoor environment, represented herein as an office building, are captured with static surveillance cameras and dynamic smart phone captured image queries, periodically over a time window. During the time window, complex scenarios are generated, including but not limited to unpredictable flow of people due to events, and unstructured changes such as rearrangement of furniture, wall, etc.

More specifically, 501 represents a floor layout of the indoor space. In a zone 503, a plurality of surveillance cameras 505, 507, 509, 511, 513, 515 are installed as the static sensing infrastructure. Areas covered by the field of view of the surveillance camera are depicted by a box around the camera in the drawing. One or more dynamic cameras, such as the cameras associated with one or more smart phones are used to capture the query images from several different users over different times.

In the scenario of FIG. 5, the six different surveillance videos are associated with a scenario in which the individuals present in the area are changing, as well as situations in which the area is rearranged. According to the example implementation, the zone was identified for the query image captured by the user using the smart phone in that zone. FIGS. 10(*a*)-10(*e*), as explained in greater detail below, provides an example use case that is associated with the above-described example environment.

Figure 6:
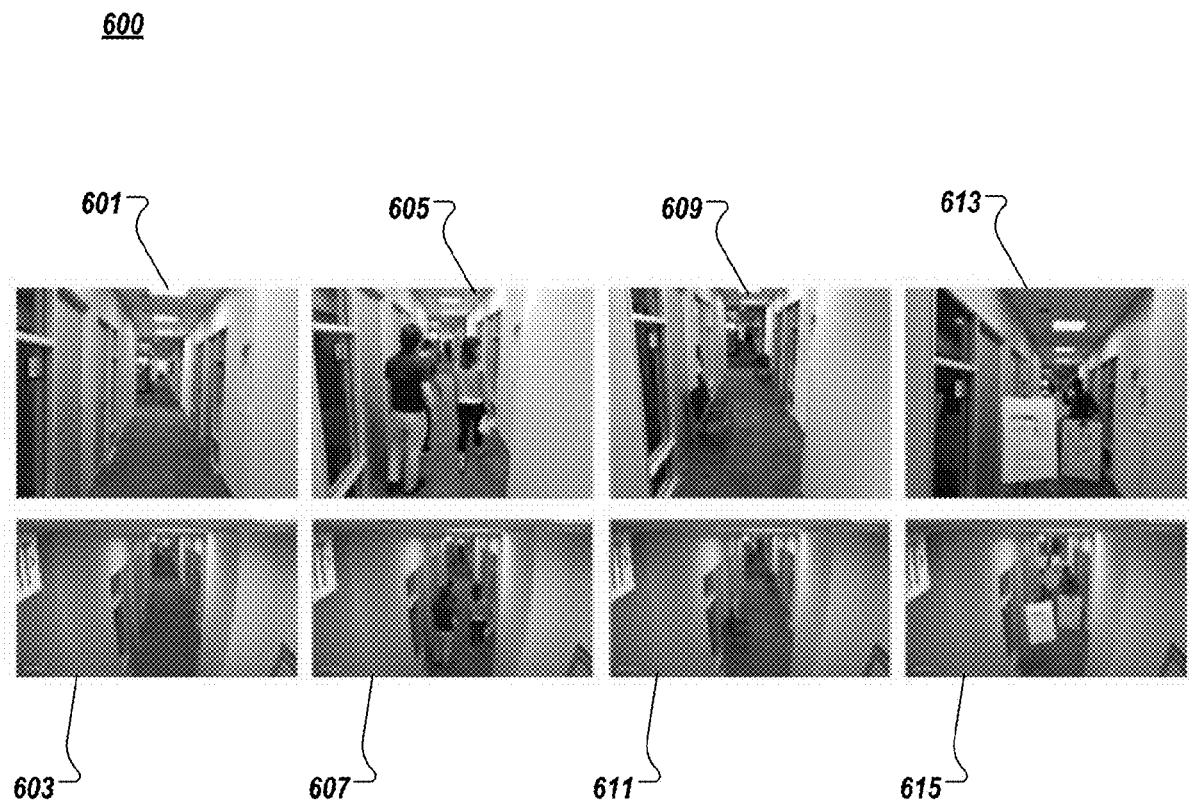
FIG. 6 illustrates an example dynamic sensor in an example environment, according to the example implementation.

FIG. 6 illustrates data collection approaches according to the example implementations associated with the example implementations described above and illustrated in FIG. 5. As shown at 600, for example viewing conditions are provided. At 601 and 603, images of a scene in a default condition are provided. At 605 and 607, the images that are provided include the scene of 601 and 603, respectively, with people moving around the area. At 609 and 611, images of the scene of 601 and 603, respectively are provided with furniture, such as tables and chairs, being moved across zones. At 613 and 615, images are provided, with people holding signs, indicative of a complex localization condition.

The impact of the forgoing unpredictable and unstructured indoor environment conditions may be assessed by dividing the data set into training and test sets for each of the different viewing conditions. For example, but not by way of limitation, the proposed models may be trained on a data set under one condition, and tested on others under different conditions. To assess the impact of the fusion of the dynamic and the static information, the example implementations are compared against a baseline that was only trained on the dynamic camera images, using the example implementation shown in FIG. 2.

As shown below in Table 1, the accuracy of the example implementation with respect to the prediction of zone level positions of query images are shown, against the unexpected conditions. As can be seen, there is a significant improvement in zone detection accuracy for the baseline approach, as compared with the approach according to the example implementation that uses the fusion approach. Thus, the example implementations provide better representation for large variation between the static and dynamic images captured within each of the zones, as well as leveraging on the complete context amongst all of the zones with triplet loss.

TABLE 1

| Trained with normal dataset | people | furniture | complex |
|---|---|---|---|
| Baseline | 0.9641 | 0.9673 | 0.7355 |
| Method1 | 0.9491 | 0.9611 | 0.9099 |
| Method2 | 0.9311 | 0.9673 | 0.8372 |

TABLE 1-continued

| Trained with normal dataset & people dataset | furniture | complex |
|---|---|---|
| Baseline | 0.9509 | 0.8547 |
| Method1 | 0.9427 | 0.8866 |
| Method2 | 0.9673 | 0.8547 |

| Trained with normal & furniture dataset | people | complex |
|---|---|---|
| Baseline | 0.9611 | 0.8750 |
| Method1 | 0.9790 | 0.9099 |
| Method2 | 0.9671 | 0.8750 |

As shown above, in the "complex" scenario, indicative of both unpredictable and unstructured conditions, the fusion methods outperform the baseline. Further, there is an improvement with the incorporation of real-time surveillance images corresponding to the query images at real time testing.

By incorporating the real-time surveillance images corresponding to the query compared to the baseline method, without incorporation of any corresponding real time surveillance images for the query, there is an advantage to the first fusion method, which explicitly utilizes all of the surveillance images associated with a query by computing the zone label based on the nearest surveillance image in the embedding space to the query images, and also to the second fusion method, in which the associated surveillance images are utilized implicitly, incorporating their high-level context information, to generate the conditioned embedding space, to compute the zone label using mean embeddings for all zones.

Accordingly, the example implementations can be shown to use computer vision technology with low cost surveillance system based localization, so as to incorporate real-time environmental context, to overcome large variations in image matching that may occur, due to unpredictable and unstructured changes in highly dynamic environments.

Figure 7:
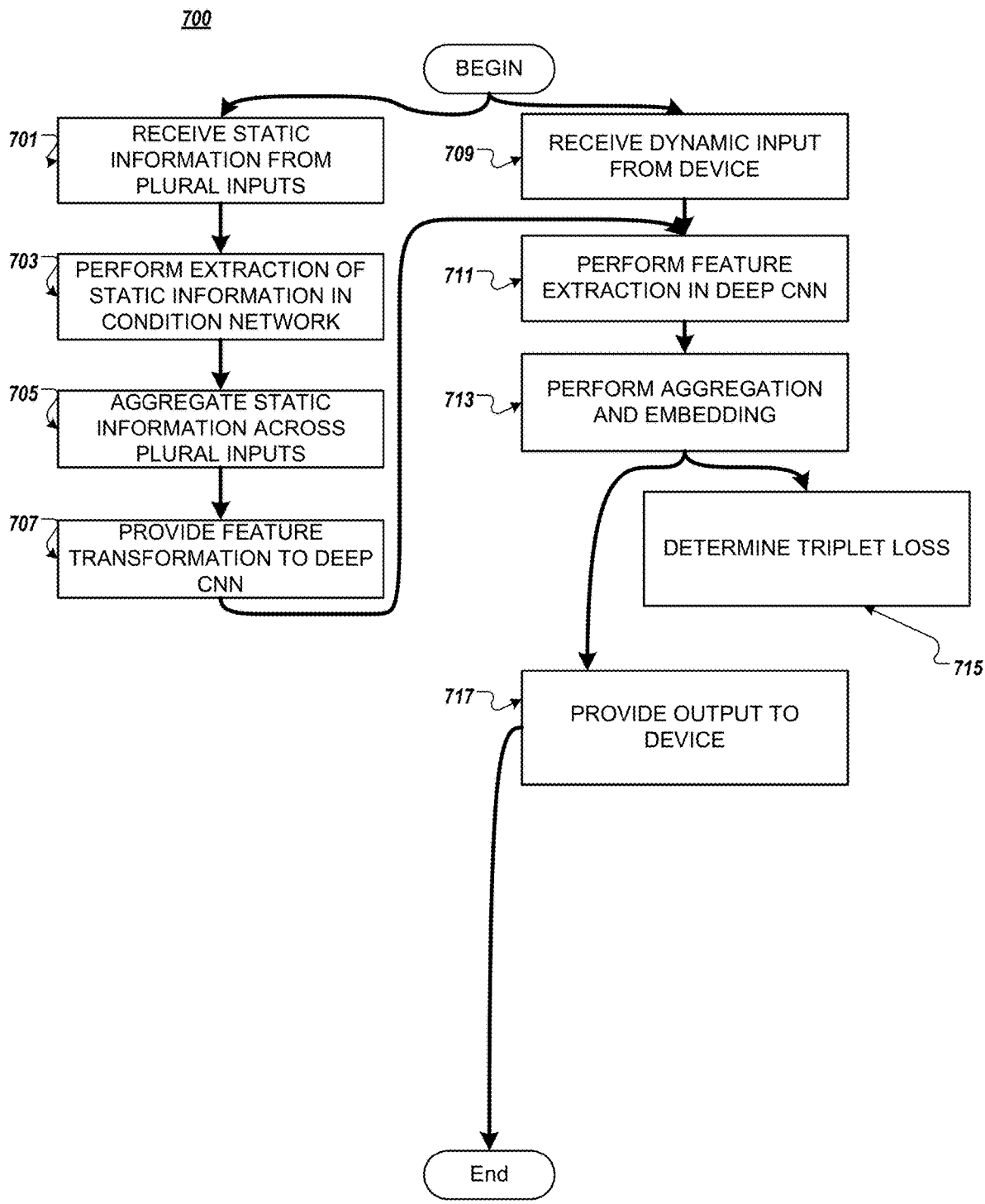
FIG. 7 illustrates an example process associated with the example baseline architecture, according to one or more example implementations.

FIG. 7 illustrates an example process 700 according to the example implementations. The example process 700 may be performed on one or more devices, as explained herein.

At 701, static information is received from sensors that are present in the subject environment. For example, but not by way of limitation, static cameras may receive sensed inputs, such as images or video.

At 703, the received static information is processed such that high-level context information is extracted from the images using the CNN architecture described above. Further, aggregation across static inputs is also performed in this operation at 705.

At 707, the result of the extracting and aggregating is provided to an embedding network, as explained in greater detail below. It is noted that the foregoing metric learning process is accordingly used to integrate the static information associated with the subject environment with the dynamic information, such as from a mobile user device associated with the user.

At 709, contemporaneously with the static image information being received, dynamic information is received from at least one sensor that is present in the subject environment. For example, but not by way of limitation, one or more cameras on a device that may be associated with a sensor at a user terminal, such as a camera on a smart phone, may be sensed and received.

At 711, the received dynamic information is used in the deep CNN architecture as described above. More specifically, for each convolution of the CNN, a feature transformation function FT is provided.

At the completion of the convolutions, in the deep CNN architecture that integrates the dynamic input and static input that was subject to the condition network and metric learning, at 713, a global pooling layer is provided to aggregate the local descriptors into a single vector, and the embedding is performed.

At 715, the triplet loss is determined, and used to train the embedding and condition network, as explained in greater detail above. Further, at 717, localization information is generated, and the user is provided with an output indicative of local positional information in an indoor environment.

Figure 8:
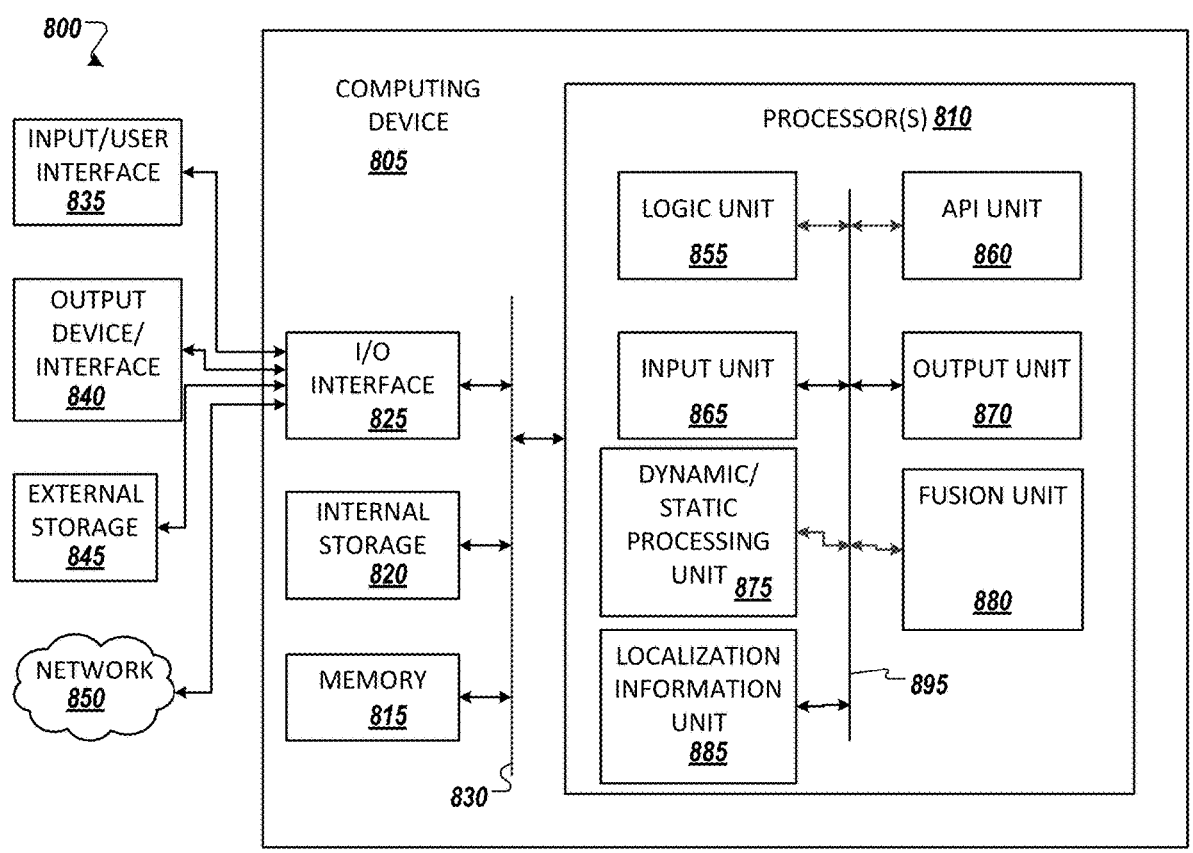
FIG. 8 illustrates an example computing environment with an example computer device suitable for use in some example implementations.

FIG. 8 illustrates an example computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/interface 835 and output device/interface 840. Either one or both of input/interface 835 and output device/interface 840 can be a wired or wireless interface and can be detachable. Input/interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/interface 835 (e.g., user interface) and output device/interface 840 can be embedded with, or physically coupled to, the computing device 805. In other example implementations, other computing devices may function as, or provide the functions of, an input/interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as, a server, client, thin server, general machine, special-purpose machine, or another label. For example but not by way of limitation, network 850 may include the blockchain network, and/or the cloud.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, dynamic/static processing unit 875, fusion unit 880, localization information unit 885, and inter-unit communication mechanism 895 for the different units to communicate with each other, with the OS, and with other applications (not shown).

For example, the dynamic/static processing unit 875, the fusion unit 880, and the localization information unit 885 may implement one or more processes shown above with respect to the structures described above. The described units and elements can be varied in design, function, configuration, or implementation and are not limited to the descriptions provided.

In some example implementations, when information or an execution instruction is received by API unit 860, it may be communicated to one or more other units (e.g., logic unit 855, input unit 865, dynamic/static processing unit 875, fusion unit 880, and localization information unit 885).

For example, the dynamic/static processing unit 875 may receive and process information from the various static sensors (e.g., security cameras) and the dynamic sensor (e.g., user device such as a smartphone having a camera). An output of the dynamic/static processing unit 875 is provided to the fusion unit 880, which performs one or more processes to fuse the static and dynamic information, as explained in greater detail above, such as with respect to FIGS. 3 and 4, for example. An output of the fusion unit 880 is provided to the localization information unit 885, which provides an output that may be received by the user device, for example, to provide information associated with the indoor localization information.

In some instances, the logic unit 855 may be configured to control the information flow among the units and direct the services provided by API unit 860, input unit 865, dynamic/static processing unit 875, fusion unit 880, and localization information unit 885 in some example implementations described above. For example, the flow of one or more processes or implementations may be controlled by logic unit 855 alone or in conjunction with API unit 860.

Figure 9:
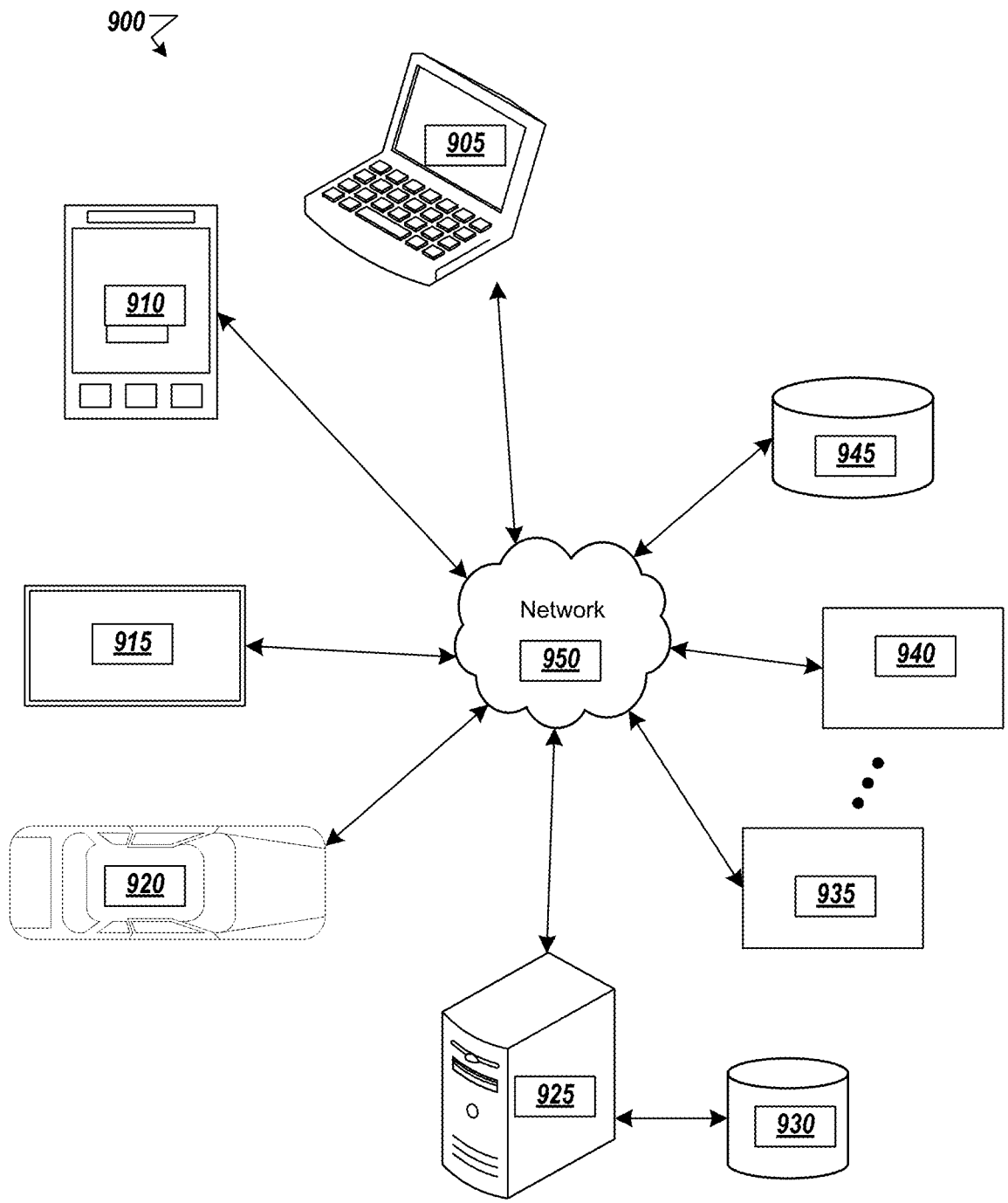
FIG. 9 shows an example environment suitable for some example implementations.
Figure 10A:
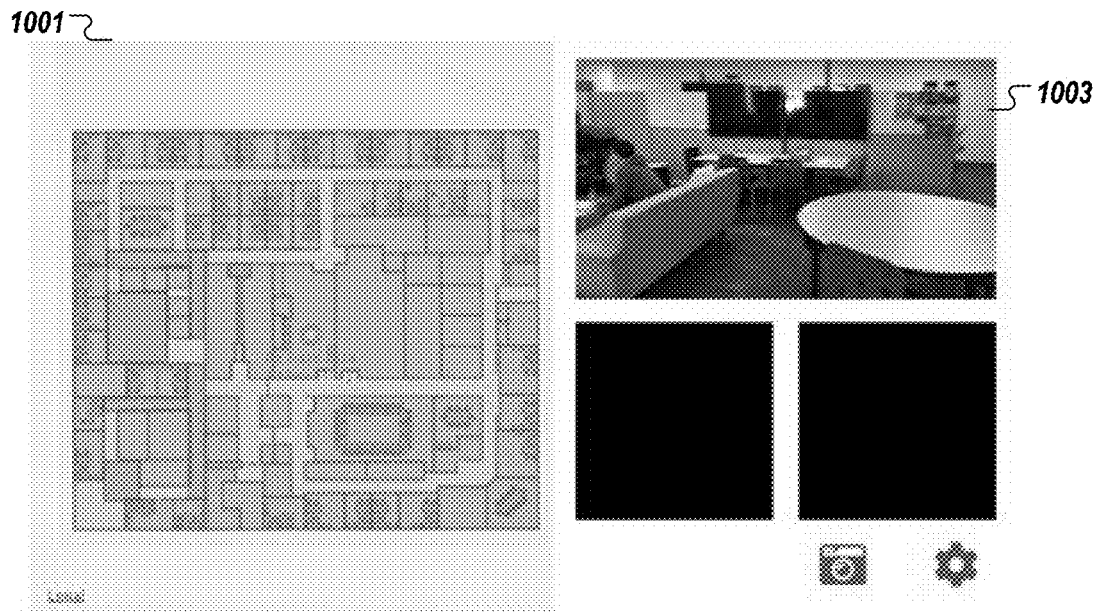
FIGS. 10(a)-10(e) illustrate an example user experience associated with the example implementations.
Figure 10B:
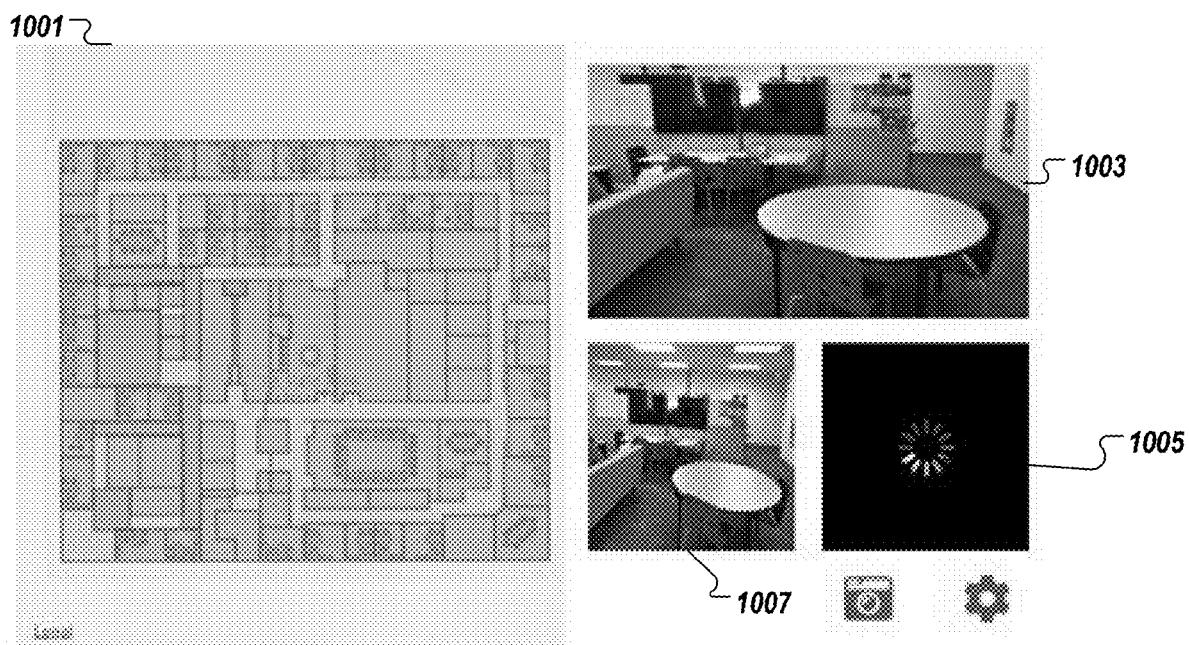
Figure 10C:
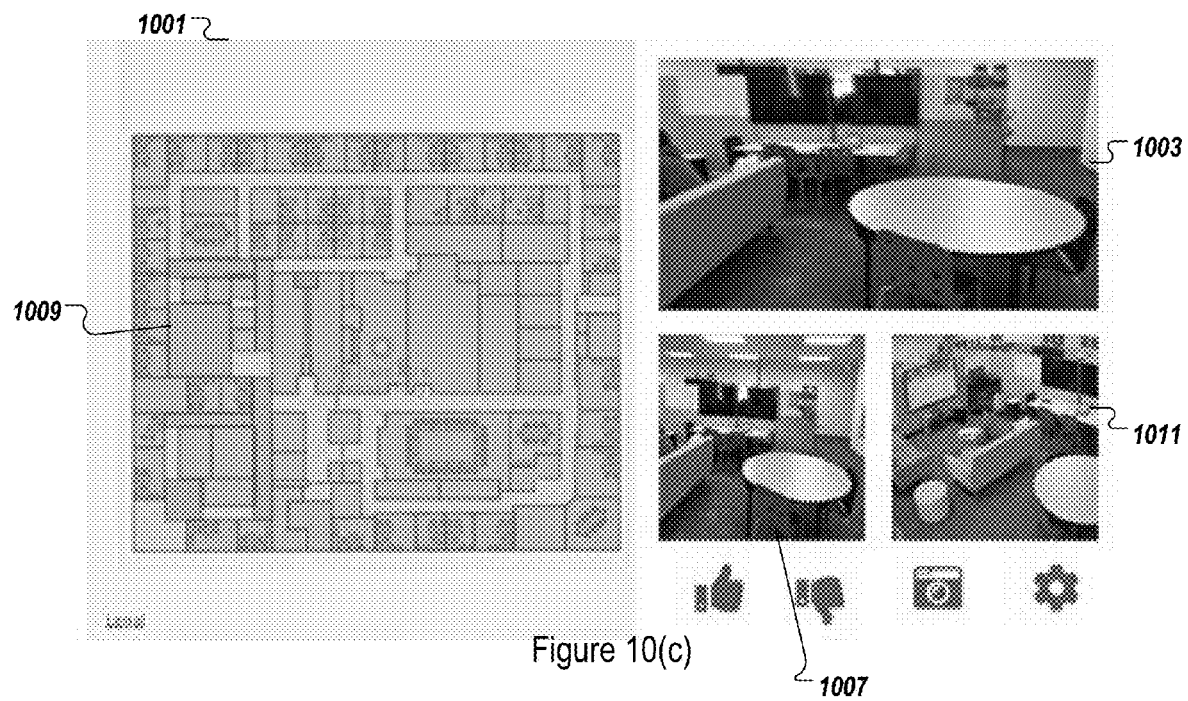
Figure 10D:
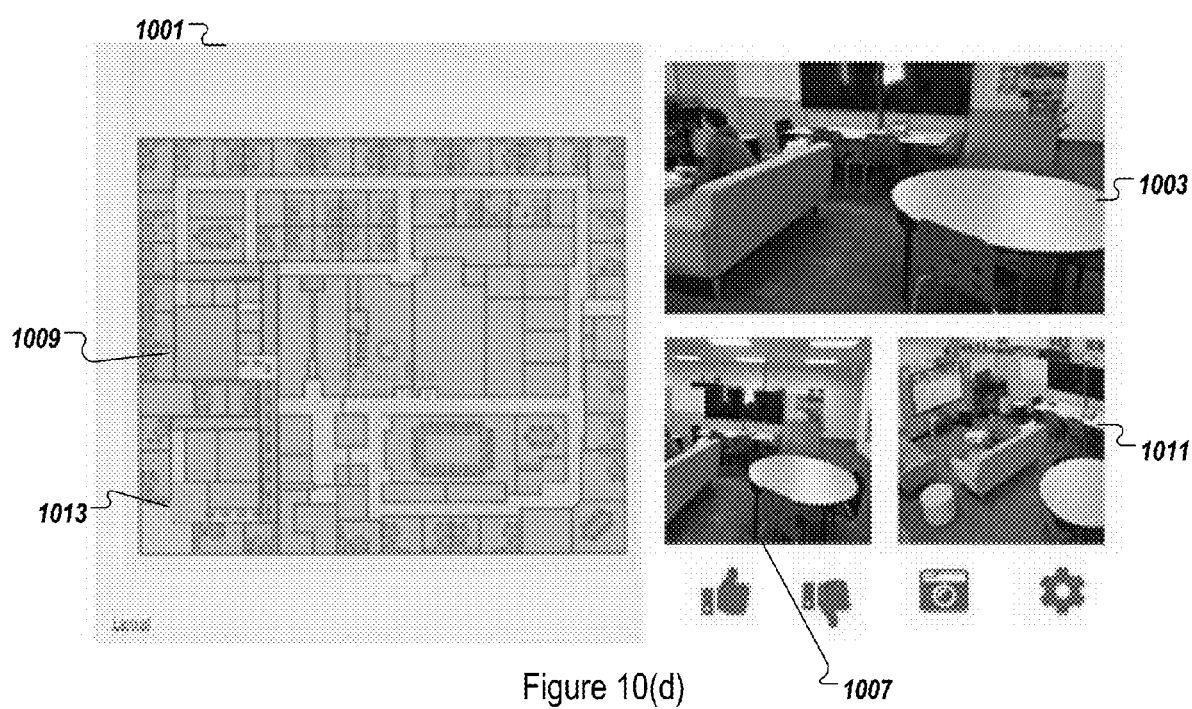
Figure 10E:
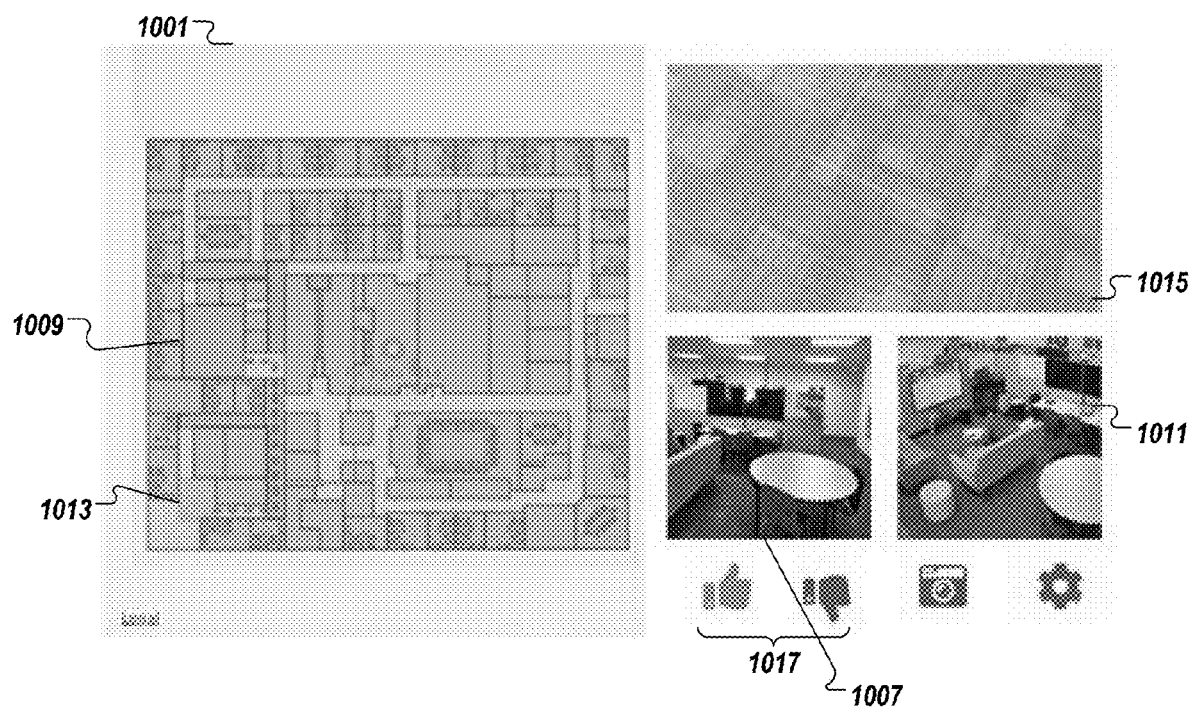

FIG. 9 shows an example environment suitable for some example implementations. Environment 900 includes devices 905-945, and each is communicatively connected to at least one other device via, for example, network 960 (e.g., by wired and/or wireless connections). Some devices may be communicatively connected to one or more storage devices 930 and 945.

An example of one or more devices 905-945 may be computing devices 805 described in FIG. 8, respectively. Devices 905-945 may include, but are not limited to, a computer 905 (e.g., a laptop computing device) having a monitor and an associated webcam as explained above, a mobile device 910 (e.g., smartphone or tablet), a television 915, a device associated with a vehicle 920, a server computer 925, computing devices 935-940, storage devices 930 and 945.

In some implementations, devices 905-920 may be considered user devices associated with the users of the enterprise. Devices 925-945 may be devices associated with service providers (e.g., used by the external host to provide services as described above and with respect to the various drawings, and/or store data, such as webpages, text, text portions, images, image portions, audios, audio segments, videos, video segments, and/or information thereabout). In the present example implementations, one or more of these user devices may be associated the static information sensors, and others of the one or more devices may be associated with the dynamic information sensor.

FIGS. 10(*a*)-10(*e*) illustrate an example user experiences associated with the present example implementations. As disclosed above, a user associated with a terminal device such as a smart phone may receive sensed dynamic images, such as by way of the camera on the smart phone. According to an example implementation, the user may be provided with an online application, which operates as a series of instructions executed by a processor. The instructions may be stored either locally at the terminal device or remotely, such as cloud or elsewhere. Further, the instructions may be executed on a processor that may be stored locally at the terminal device or remotely, as explained above. An output of the online application is provided to the user such that the user has an indoor experience providing indoor localization information.

As shown in FIG. 10(*a*), the online application may be launched by the user on the terminal device, and may provide an initial floorplan 1001 associated with a location of the user. Further, an image 1003 may be provided to the user; the image is based on information received from the sensor that is active on the user device.

As shown in FIG. 10(*b*), an image may be captured by the user. The captured image, which is provided to the example implementations as the input dynamic information, is also displayed to the user at 1007. The floorplan shown at 1001 remains the same as the original floorplan.

At this point, the forgoing example implementations are using the sensed dynamic image that was captured and is shown at 1007, combined with static images from one or more static image sensors that are shown, for example in FIG. 5 as described above. For example, but not by way of limitation, the forgoing operations described with respect to FIGS. 4 and 7 may be performed, represented in the user interface as shown at 1005, as a symbol indicative of ongoing processing operations.

As shown in FIG. 10(*c*), once the example implementations have completed the operations as explained above, and image associated with a predicted zone based on the surveillance system is provided at 1011. Further, the predicted zone is highlighted on the floorplan as shown at 1009.

At this point, the user, via the interface on the device associated with the user, receives a display of a current camera image 1003, a captured camera image 1007 that has been provided for processing as the dynamic information, and an image of the surveillance system for the predicted zone at 1011.

As shown in FIG. 10(*d*), a user may wish to navigate from the predicted current location shown at 1009, to another location, using the floorplan as a guide. Thus, the user may provide an input to the online application, such as by touching a portion of the floorplan having the static sensors associated with the surveillance system.

At this point, the user selects another location on the floorplan as 1013. The online application generates a path to the desired destination at another location, as shown in FIG. 10(*d*) by broken lines. Accordingly, the user may navigate from the current location to the desired location using the floorplan, based on the prediction provided by the foregoing example implementations.

As the user navigates from the current location to the desired location, the current image information of the cameras associated with the user device may change as shown in FIG. 10(*e*). For example, at 1015, the user is walking from the location shown on the floorplan as 1009 to the desired location at 1013. Optionally, one or more additional interfaces may be provided to show the user information associated with a new current location, as the user travels from the original location to the desired destination, depending on the presence of static sensors.

According to another example implementation, a predicted or historical image associated with the desired destination (e.g., from past navigation iterations, or from actual surveillance system information) may also be provided to the user throughout the process, in case there are many very similar environments to the destination. For example, in the example implementation of a train station having many exits that may appear similar to one another, such information may be useful so that the user can determine if the user is at the desired destination. If not, the user may then adjust their positioning and attempt to navigate to the desired destination again.

Once the user has successfully arrived at the destination, the user may provide feedback via the online application as to the correctness of the result. For example, this may take the form of a binary approval or disapproval, as shown at 1017. Alternatively, other options may be provided to the user, such as more granular feedback requests when the result is not correct as to the portions that were not correct, or information associated with changes in the environment that can be fed back into the model for future use.

The example implementations may have various benefits and/or advantages. For example, but not by way of limitation, the example implementations leverage complete environmental context with multiple surveillance camera based real world systems, and does not suffer from the weak framework of the related art that relies on semantic detectors. Thus, by being independent of individual semantic detectors, and by incorporating real-time context with deep learning based fusion, the example implementations provide a reliable real time, context-based approach. Responses from plural users may be aggregated to provide larger-scale feedback.

Additional aspects of the example implementations may optionally include leveraging of existing zone level localization to reduce the search space, and provide efficient computing for localization with camera pose details. Further, self-supervised semantic activity detection and monitoring may be performed within each zone, as well as across zones, to provide high-quality context beyond localization information and user or device centric activity patterns. The example implementations may be adapted to the context of indoor navigation, robot re-localization, calibration free large-scale AR/VR, or the like. Use environments may include, but are not limited to, busy train stations, crowded shopping malls, exhibition halls and the like.

Further, in contrast to related art approaches, such as those that use magnetic fields to utilize a locally anomalous and stable geomagnetic field for indoor localization, the example implementations provide a much higher localization accuracy than the 3.5 m accuracy of the magnetic field based related art approach. Due to the low accuracy of the related art approach, the uniqueness of the related art localization fingerprint cannot be guaranteed.

Additionally, and in contrast to related art approaches, the example implementations do not require modifications of existing static sensing infrastructure, such as security camera systems, while at the same time integrating a computer vision approach that does not rely on intermediate, low accuracy semantic inference modules, heuristic models, or other expensive sensor infrastructure. According to the example implementations, this is accomplished by formulating the approach as an efficient image retrieval deep learning model that leverages real-time surveillance data information without labor intensive ground truth labeling for generating a large-scale image database, to predict accurate indoor localization, even in the highly dynamic environments, with the unpredictable and unstructured changes in those environments. Accordingly, a low-cost, highly accurate indoor localization system may be provided, which may be able to provide detailed pose estimation, and may also be integrated with other applications, including but not limited to indoor navigation, robot relocalization, and or calibration free, large-scale AR/VR.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of localization for an indoor environment, comprising:
   receiving, in real-time, a dynamic query from a first source, and static inputs from a second source;
   extracting features of the dynamic query on a deep convolutional neural network (CNN) as an embedding network;
   extracting features of the static inputs by applying a CNN as a condition network, and aggregating the extracted features of the static inputs to generate a feature transformation, and to modulate intermediate features of the embedding network by using the feature transformation; and
   applying a triplet loss function to optimize the embedding network and the condition network, and to provide a localization result.

2. The computer-implemented method of claim 1, wherein the localization result comprises a prediction indicative of a location of the first source in the indoor environment.

3. The computer-implemented method of claim 1, wherein the dynamic query comprises an image and the first source is a mobile terminal device associated with a user, and the real-time static inputs comprise static images from the second source comprising a cameras networked in the indoor environment.

4. The computer-implemented method of claim 1, wherein the static inputs are geo-tagged.

5. The computer-implemented method of claim 1, wherein the localization result is provided during an unpredictable condition and/or an unstructured condition in the indoor environment.

6. The computer-implemented method of claim 1, wherein the unpredictable condition comprises a change in objects and/or persons in the indoor environment, and the unstructured condition comprises a change in a layout of the indoor environment, and wherein the extracted features associated with the static inputs comprise high-level context information, and wherein the feature transformation comprises a scaling parameter and a shifting parameter.

7. The computer-implemented method of claim 1, the extracting the features of the dynamic query on the deep CNN further comprises applying a metric learning CNN, and iteratively extracting the features of the dynamic query on the deep CNN and fusing the feature transformation into the deep CNN.

8. A server capable of localization for an indoor environment, the server configured to perform the operations of:
   receiving, in real-time, a dynamic query from a first source, and static inputs from a second source;
   extracting features of the dynamic query on a deep convolutional neural network (CNN) as an embedding network;
   extracting features of the static inputs by applying a CNN as a condition network, and aggregating the extracted features of the static inputs to generate a feature transformation, and to modulate intermediate features of the embedding network by using the feature transformation; and
   applying a triplet loss function to optimize the embedding network and the condition network, and to provide a localization result.

9. The server of claim 8, wherein the localization result comprises a prediction indicative of a location of the first source in the indoor environment.

10. The server of claim 8, wherein the dynamic query comprises an image and the first source is a mobile terminal device associated with a user, and the real-time static inputs comprise static images from the second source comprising a cameras networked in the indoor environment.

11. The server of claim 8, wherein the static inputs are geo-tagged.

12. The server of claim 8, wherein the localization result is provided during an unpredictable condition and/or an unstructured condition in the indoor environment, and wherein the unpredictable condition comprises a change in objects and/or persons in the indoor environment, and the unstructured condition comprises a change in a layout of the indoor environment.

13. The server of claim 8, the extracting the features of the dynamic query on the deep CNN further comprises applying a metric learning CNN, and iteratively extracting the features of the dynamic query on the deep CNN and fusing the feature transformation into the deep CNN.

14. The server of claim 8, wherein the extracted features associated with the static inputs comprise high-level context information, and wherein the feature transformation comprises a scaling parameter and a shifting parameter.

15. A non-transitory computer readable medium having a storage that stores instructions executed by a processor, the instructions comprising:
　　receiving, in real-time, a dynamic query from a first source, and static inputs from a second source;
　　extracting features of the dynamic query on a deep convolutional neural network (CNN) as an embedding network;
　　extracting features of the static inputs by applying a CNN as a condition network, and aggregating the extracted features of the static inputs to generate a feature transformation; and
　　applying a triplet loss function to optimize the embedding network and the condition network, and to provide a localization result.

16. The non-transitory computer readable medium of claim 15, wherein the localization result comprises a prediction indicative of a location of the first source in the indoor environment.

17. The non-transitory computer readable medium of claim 15, wherein the dynamic query comprises an image and the first source is a mobile terminal device associated with a user, and the real-time static inputs comprise static images from the second source comprising a cameras networked in the indoor environment and wherein the static inputs are geo-tagged.

18. The non-transitory computer readable medium of claim 15, the extracting the features of the dynamic query on the deep CNN further comprises applying a metric learning CNN, and iteratively extracting the features of the dynamic query on the deep CNN and fusing the feature transformation into the deep CNN.

19. The non-transitory computer readable medium of claim 15, wherein the localization result is provided during an unpredictable condition and/or an unstructured condition in the indoor environment, wherein the unpredictable condition comprises a change in objects and/or persons in the indoor environment, and the unstructured condition comprises a change in a layout of the indoor environment.

20. The non-transitory computer readable medium of claim 15, wherein the extracted features associated with the static inputs comprise high-level context information, and wherein the feature transformation comprises a scaling parameter and a shifting parameter.

* * * * *